United States Patent Office 2,812,954
Patented Nov. 12, 1957

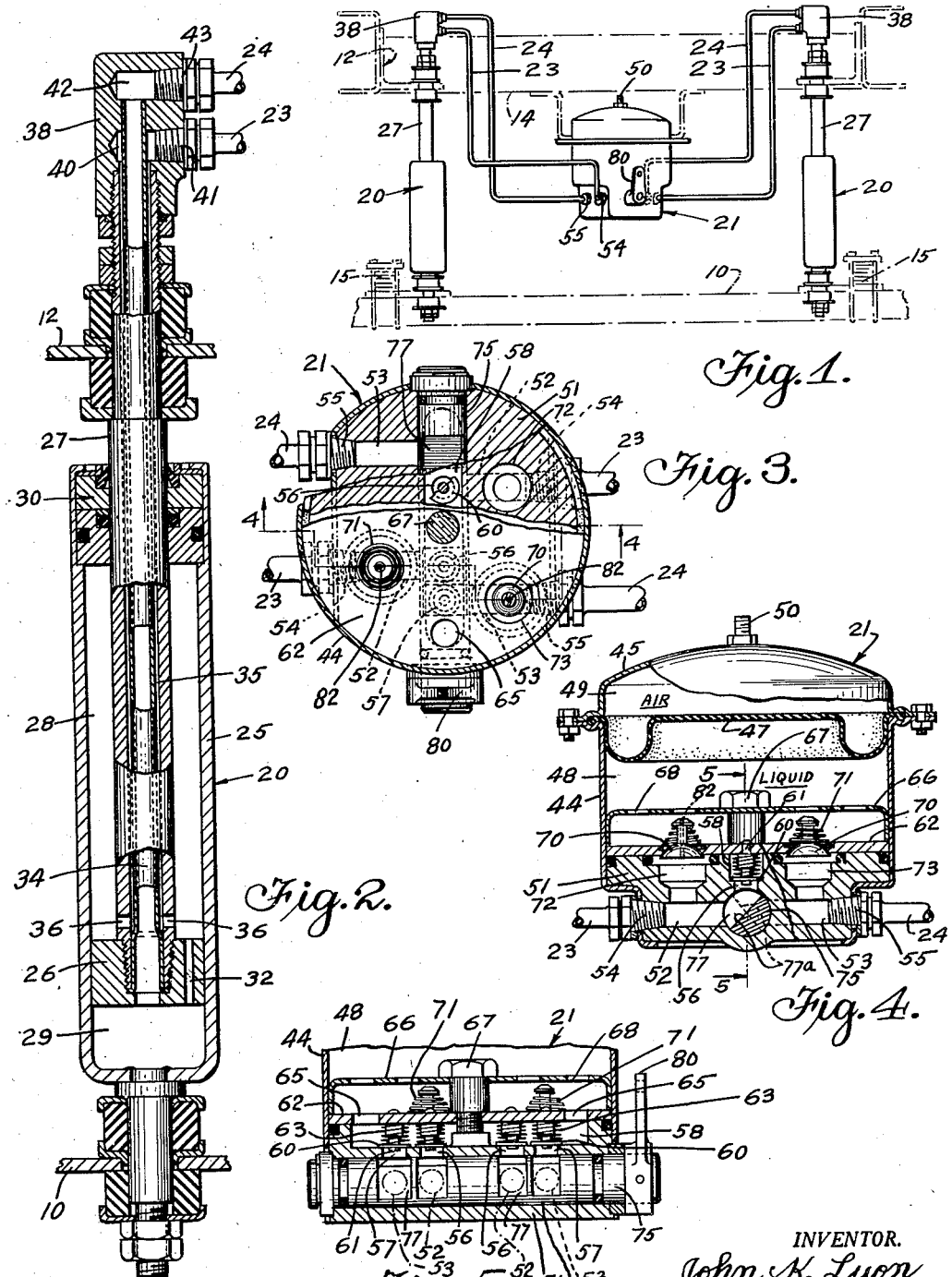

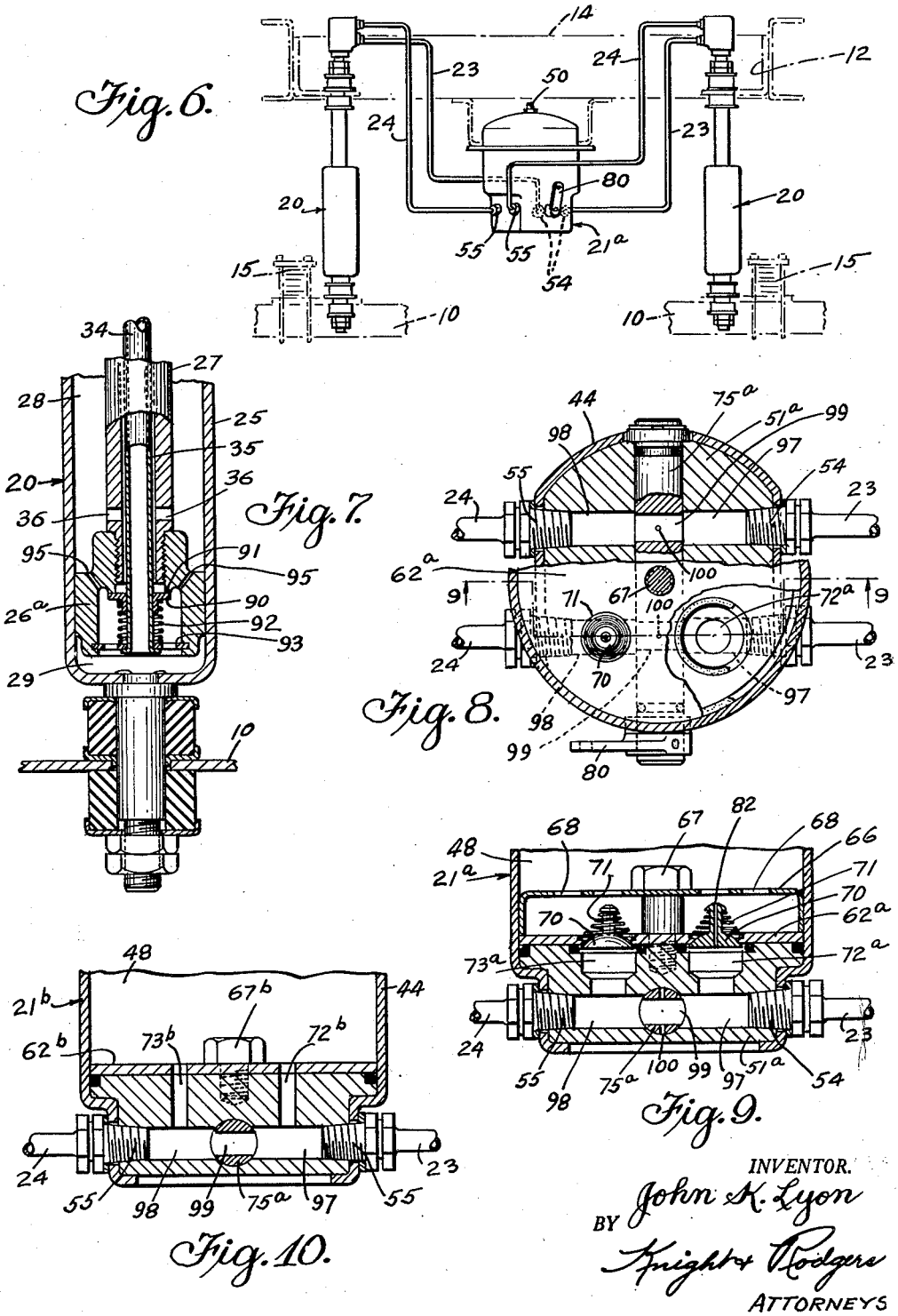

2,812,954

RIDE STABILIZING SYSTEM FOR AUTOMOBILES

John K. Lyon, Pasadena, Calif., assignor of one-half to Karl J. Kraus, Las Vegas, Nev.

Application October 1, 1954, Serial No. 459,603

10 Claims. (Cl. 280—124)

The present invention relates generally to suspension systems for automotive vehicles and more especially to a ride stabilizing system which includes hydraulic shock-absorbers on the vehicle. The invention has been particularly designed for use with pleasure-type automobiles and will be so described; but it will be understood that in its broader aspect the invention is not limited to any particular type of vehicle.

It is customary to provide motor vehicles with springs interposed between the body and the wheels in order to make the vehicle ride more easily by absorbing shocks imparted to the vehicle by unevenness in the roadway. The body and other elements of the vehicle which are supported on and by the springs are commonly referred to as the sprung mass while the wheels and axles or other similar elements upon which the springs are supported are referred to as the unsprung mass. The purpose of the springs is to allow relative movement between these two masses of the vehicle.

If the springs are made relatively stiff and unyielding, the characteristics of the ride produced may be described as "hard." Under these conditions, the springs transmit to the body and to people riding in it much of the shock from inequalities in the road surface. Consequently, stiff springs are comfortable only when the road is comparatively smooth. The demand for comfort has resulted in most pleasure-type vehicles being equipped with springs which are comparatively flexible or yielding, the ride in this case being described as "soft." Because of this yielding nature of the springs, there is much more relative movement between the wheels and the body so that the amount of shock transmitted to the body is substantially decreased and a greater degree of riding comfort is obtained. But it becomes necessary to control the action of springs of this type with shock-absorbers which, especially after an initial rapid or extreme movement of the springs, prevent the return movement from being too violent and serve to quickly damp the vibrations of the springs. The action of these shock absorbers, of course, places some limitations upon the degree of comfort which can be obtained.

This high degree of riding comfort is secured at the expense of other characteristics. The very flexible nature of the springs reduces the control that they exert over the position of the body and allows the body to tilt sideways when the vehicle turns, the sway being especially pronounced at a sharp corner. Likewise, the body dips down in front when the brakes are suddenly applied. This excessive movement of the sprung mass with respect to the wheels of the vehicle can be very dangerous since it may produce skidding or loss of control of the vehicle by the driver when travelling at high speed. As a result, it may be dangerous to drive a car having "soft" springs over a relatively rough road or one having sharp turns unless the speed of the vehicle is kept low. Shock-absorbers of conventional design can control this situation by stabilizing the position of the body over the wheels but only at the expense of riding comfort. As a result, when the degree of control exerted by the shock-absorbers is sufficiently great to reduce these hazards, the ride again becomes a "hard" one.

Shock-absorbers and springs are alike in that they can be designed and engineered to meet satisfactorily a given set of conditions, for example, road roughness, vehicle loading, speed, and the like. However, they operate at their best over only a relatively narrow range of conditions. In their usual design they do not have sufficient flexibility of action to meet successfully all conditions which may be encountered by many vehicles. As applied to the usual pleasure car, these elements of the suspension system represent a compromise between the desire on one hand for a smooth, comfortable ride and the requirement, on the other hand, for a sufficient degree of stability in the means supporting the body to make the vehicle safe. One condition can be met only at the expense of the other; and the degree of compromise differs with the ideas of different designers and the probable uses to which the vehicle will be put.

Various attempts have been made to overcome this situation by providing shock-absorbers or stabilizing systems which are adjustable. The object is to make a suspension system for a vehicle which has comfortable riding qualities and yet which can be easily adjusted to effect an increase in the degree of control which is exercised over the body movement. The result is an increase in the range of satisfactory operation of the elements of the suspension system. Adjustable features of this character have seen only limited applicability because of their complications in operation and the cost of manufacture, but they are of particular benefit when applied to vehicles which are apt to be driven at relatively high rates of speed.

In the case of hydraulic shock-absorbers, this adjustment is usually attained by regulating the flow of fluid caused by movement in the shock absorbers. If this regulation is accomplished by means located at each shock-absorber or similar unit, it presents obvious disadvantages. In the first place, it is often too much trouble to be changed easily and is therefore neglected. Also it is difficult to obtain the same amount of adjustment in each of the individual units. Another disadvantage is the ever present possibility of mechanical failure. Should the adjusting means on one shock-absorber fail, then the car would be rendered dangerously unstable because of the inequality of control effected by the several shock-absorbers.

From investigation of the requirements of a system of this type, it has been found that a limited number of degrees of control are adequate for normal driving purposes. Thus a control mechanism having perhaps two or three positions of adjustment for as many degrees of control is adequate for ordinary conditions.

Hence it is a general object of my invention to provide a fluid-type shock absorbing and stabilizing system for a vehicle which includes means for adjusting the degree of control or stabilization imparted to the vehicle body.

It is a further object of my invention to provide a shock absorbing and stabilizing system of this character in which a change in the degree of stabilization is effected by a single means which simultaneously regulates fluid flow for a plurality of shock-absorber units.

It is a further object of my invention to provide a system of this character in which the flow regulating means is simple in construction, reliable in operation, and, in a basic form, enables the driver of the vehicle at will to provide either of two degrees of stabilizing control to the system.

These and other objects are achieved in a stabilizing system constructed according to my invention which is provided with one or more cylinders each having a piston reciprocable within the cylinder and dividing the cylinder into two separate chambers each filled with liquid, each cylinder having passage means, preferably a passage through the piston, extending between the two chambers for a transfer of fluid at a restricted rate of flow between the two chambers. An accumulator is provided which is connected by suitable conduit means to each of the cylinder chambers so that each chamber of each cylinder is directly connected to the accumulator to discharge excess liquid into the accumulator or to receive liquid from the acumulator for replenishing purposes. This conduit means is of a size to permit relatively free and unobstructed flow between the cylinder chambers and the accumulator as compared with a relatively restricted rate of flow between the two chambers through the above mentioned passage means.

Valve means are associated with each conduit means for restricting flow into the accumulator. Typically, this means includes a relief valve which prevents flow into the accumulator until the liquid pressure exceeds a predetermined value and a normally closed check valve which, when open, allows relatively free flow of liquid out of the accumulator into the cylinder chamber for replenishment purposes. Flow regulating means is associated with all of the conduits to regulate flow equally and simultaneously in all of the conduits. This is preferably located in the base of the accumulator between the cylinders and the relief valves. In a preferred embodiment, this valve is simply a plug valve which extends across all conduits entering the accumulator and upon rotation of the valve member is adapted to move from a first position offering substantially no obstruction to flow, and thereby providing a "soft" ride, to a second flow restricting position in which little or no liquid flow past the flow regulation means is permitted, thereby providing a "hard" ride. In addition, means are provided for applying suitable atmospheric pressure to the liquid in the system. This preferably takes the form of a body of elastic fluid under superatmospheric pressure within the accumulator and in pressure transmitting relation to a body of liquid in the accumulator.

How the above objects and advantages of my invention, as well as others not specifically referred to herein, are attained, will be more readily understood by reference to the following description and to the annexed drawings, in which:

Fig. 1 is a partly diagrammatic elevation of a stabilizing system constructed according to my invention, showing two cylinders attached by suitable conduits to a single accumulator;

Fig. 2 is a vertical median section through a cylinder;

Fig. 3 is a horizontal section through the lower portion of the accumulator, parts being broken away at different levels in order to disclose construction of the several valves in the accumulator;

Fig. 4 is a vertical section through the accumulator on line 4—4 of Fig. 3;

Fig. 5 is a fragmentary vertical median section through the accumulator on line 5—5 of Fig. 4;

Fig. 6 is a view similar to Fig. 1 showing a variational embodiment of my invention;

Fig. 7 is a fragmentary vertical median section through the lower end of one cylinder showing the variational form of piston therein;

Fig. 8 is a horizontal section through a variational form of accumulator, parts being broken away to show the valves therein;

Fig. 9 is a fragmentary vertical median section through the accumulator on line 9—9 of Fig. 8; and Fig. 10 is a view similar to Fig. 9 showing a further variational construction of the accumulator.

Referring now to the drawings, it will be understood that my improved ride stabilizing system is attached to the chassis of an automobile. Since the chassis is of conventional construction it is not shown in detail; but the chassis includes an axle 10, typically a front axle, and a frame, indicated generally at 12, which includes a transverse cross member 14. The frame 12 is mounted upon the axle by means of suitable springs which are indicated only diagrammatically at 15. The wheels and the axles are included in the unsprung weight or mass of the vehicle. The frame 12 with the body or other parts mounted thereon and supported by the springs are included in the sprung weight or mass of the vehicle.

The shock absorbing and stabilizing system for the vehicle comprises, in a typical form of the invention, a pair of shock-absorbers indicated generally at 20 and connected at their opposite ends to the sprung and unsprung masses of the vehicle, and an accumulator 21 which is typically mounted upon transverse frame member 14. Accumulator 21 is connected to the shock-absorbers by conduits 23 and 24, as shown generally in Fig. 1.

Each of the shock-absorbers 20 is shown in greater detail in Fig. 2. Each one includes a cylinder 25 within which is a piston 26, the piston being reciprocable within the cylinder and dividing the interior of the cylinder into an upper chamber 28 and a lower chamber 29. At its lower end, cylinder 25 is closed and is attached by suitable means to axle 10.

Piston 26 is provided with hollow piston rod 27 which extends out of and above the upper end of cylinder 25 where the piston rod passes through suitable packing means, indicated generally at 30, which provides a fluid-tight seal around the rod at the upper end of the cylinder. Piston rod 27 is connected in any suitable manner to body frame 12; and the piston rod preferably extends above this point of connection for a short distance in order to permit attachment of conduit means 23 and 24, all as shown particularly in Fig. 2.

Piston 26 is provided with passage 32 extending from one face of the piston to the other to provide passage means for transfer of fluid between chambers 28 and 29 of the cylinder as the piston is reciprocated within the cylinder. A passage as at 32 through the piston is a preferred form of passage means for this purpose; but it will be realized that other types of passage means at other locations may be used. For example, it will be clearly understood without further description that transfer of fluid between the two chambers could be effected by allowing liquid to leak at a measured rate around the piston by arranging suitable clearance between it and the cylinder wall.

Piston rod 27 is hollow and has within it tube 34 which is of smaller diameter than the interior bore of the piston rod so that there is provided between tube 34 and the inside wall of piston rod 27 an annular space 35. The wall of piston rod 27 is provided with one or more openings 36 which are preferably located just above piston 26 in order that upper chamber 28 may be in free communication with annular space 35 through openings 36. The lower end of the piston rod is open so that the inside of tube 34 can communicate through an opening in piston 26 with lower cylinder chamber 29.

Piston rod 27 extends upwardly above the means for connecting it to frame 12 in order to receive fitting 38 which is screwed or otherwise attached to the upper end of the piston rod. Fitting 38 is provided with a lower transverse bore 40 into which is screwed nipple 41, bore 40 communicating with the upper end of annular space 35. Tube 34 extends upwardly above bore 40 where it engages the body of fitting 38 with a snug fit and terminates at upper transverse bore 42 into which is threaded nipple 43. Nipples 41 and 43 have connected to them conduits 23 and 24 respectively. These two conduits are connected at the other end to accumulator 21, which is shown in greater detail in Figs. 3 and 4.

Accumulator 21 is here shown as being of the diaphragm type, although the invention is not necessarily limited to this design. The accumulator is a hollow vessel of which the shell is made in two parts 44 and 45. These two portions of the shell are flanged as shown in Fig. 4 so that they may be bolted together and they clamp between them the peripheral margin of a flexible diaphragm 47 which divides the interior of the accumulator into two compartments 48 and 49.

Upper compartment 49 is filled with air or other elastic fluid at some pressure above atmospheric, it being found in practice that pressures in the range of 50 to 100 pounds p. s. i. are satisfactory. The compartment 48 below diaphragm 47 is completely filled with hydraulic fluid, the same liquid that is used in shock-absorbers 20. Diaphragm 47 is preferably made of rubber or similar material which is impervious to air and inert with respect to the liquid. The diaphragm is not necessarily elastic but is flexible enough to move up and down to create a variation in the volume of lower compartment 48. Diaphragm 47 prevents air from going into solution in the hydraulic fluid; and it may be dispensed with if a liquid is used that does not dissolve air.

As a means for charging compartment 49 with air under pressure or for releasing air from the compartment, upper portion 45 of the accumulator shell is provided with an air valve 50, such as the familiar tire valve.

Within accumulator 21 and at the bottom of the shell is casting 51 which forms a body for connecting the various conduits to the accumulator and also for mounting in place the valve means which control liquid flow through the conduits. As shown particularly in Figs. 3 and 4, there extend in from each of two opposite sides of casting 51 a pair of bores 52 and 53. The outer end of each of these bores is threaded to receive a nipple 54 and 55 respectively. To these two nipples are connected conduits 23 and 24 respectively. When the accumulator is in the upright position shown in Fig. 4, the axes of bores 52 and 53 are horizontal and the bores extend half way through base 51. At their inner end each horizontal bore connects with a short vertical passage, 56 or 57 respectively. As shown in Fig. 5, there are four of these vertical passages 56 and 57 all of which communicate at their upper ends with a transverse slot or well 58 which opens to the upper side of body 51.

Since the diameter of passages 56 and 57 is somewhat less than the width of well 58 (see Fig. 4) there is at the upper end of each passage 56 and 57 a shoulder. This shoulder serves as a seat which is engaged by valve 60. There is one of these valves at the upper end of each of the four passages 56 and 57, all of these valves being alike. Each one consists of a disc 60 slidably mounted on a vertical pin 61 mounted on valve plate 62. Valve 60 is normally in engagement with the seat since it is biased by spring 63 to a closed position. Spring 63 is a coil spring under compression which is confined between valve 60 and the under side of plate 62.

When valve 60 is lifted by liquid pressure off its seat, liquid can pass upwardly through one of the passages 56 or 57 into well 58 and thence upwardly through one of the openings 65 in plate 62 into lower compartment 48 of the accumulator, which compartment is completely filled with liquid.

Valve plate 62 rests on top of casting 51 and is held in place by hold-down 66 which is an inverted, cup-shaped member with an annular flange which bears downwardly around the perimeter of plate 62. Hold-down 66 is held in place by shoulder bolt 67 which passes through the hold-down and is screwed into a threaded bore in body 51. Hold-down 66 is provided with a number of openings 68 through which liquid passes freely between the spaces above and below the hold-down as parts of the accumulator compartment 48. Valves 60 are spoken of as relief valves because they in effect relieve pressure in passages 52—56 or 53—57. When the liquid pressure underneath any one of the valves reaches or exceeds a predetermined value, the pressure causes the valve to open against the action of spring 63 and liquid flows upwardly past the valve into accumulator compartment 48.

Also mounted upon valve plate 62 are four replenishing valves 70. Valves 70 are simple check valves which when closed engage the sides of an opening in valve plate 62, each valve being biased by spring 71 towards the raised or closed position as shown in Fig. 4. Each valve 70 is so disposed that liquid pressure underneath it causes it to seat more firmly whereas it can be opened by even a small decrease in pressure in the liquid below the valve, allowing liquid to flow downwardly through plate 62. Each one of valves 70 is located immediately above a passage 72 or 73 in body casting 51, the lower end of each passage 72 communicating with one of horizontal passages 52 while the lower end of each passage 73 communicates with one of the horizontal passages 53.

Passages 52 and 53 extend inwardly from opposite sides to a position approximately halfway through the body 51. In this way all four passages 56 and 57 are aligned and it is possible to regulate the flow of fluid from passages 52 and 53 into the communicating passages 56 and 57 respectively by a single flow regulating means. For this purpose there is provided centrally of body 51, a simple rotary valve 75 which intersects the ends of all four passages 52 and 53 and thus is able simultaneously to control flow of liquid in all the conduit means represented by these four passages.

Without necessarily limiting the invention to any particular type of flow control means at this point, valve 75 is a cylindrical member journaled within base 51 and provided with four slots 77 of which one is aligned with the end of each of passages 52 and 53. The four slots 77 are so arranged that when the rotary valve is in the normal or open position shown in Figs. 4 and 5 these slots 77 establish free communication between each of the four horizontal bores 52 and 53 and the associated one of the vertical passages 56 and 57 respectively. In this position the valve interposes no obstacle to free flow of liquid through these passages into the accumulator.

When valve 75 is rotated 90° from the position shown, the base 77a of slot 77 shown in full lines in Fig. 4 assumes the position shown in broken lines, thus blocking flow from each passage 52 into a passage 56 and from each passage 53 into a passage 57. This restriction on liquid flow is imposed equally in all passages simultaneously by the same rotational movement of valve 75. To enable the driver of the automobile to manipulate the valve at will, one end of the valve 75 is provided with arm 80 which may be connected by a flexible cable or other suitable linkage, not shown in the drawings, to a manual control located within easy reach of the driver.

It will be seen from the foregoing that each of the cylinder chambers 28 and 29 is provided with conduit means which separately and directly connects the cylinder chamber with the accumulator. Liquid may be transferred between any chamber and accumulator compartment 48 through such conduit means without the necessity of passing any liquid through passage 32 which permits the transfer of liquid at only a relatively restricted rate. By comparison with the rate at which liquid can flow through passage 32, each of the two conduit means are able to pass liquid comparatively freely and at an unrestricted rate, subject to any restriction imposed by valves 60 or 70.

The conduit means from each of the two cylinders 25 is made as closely alike as mechanically possible in order that a balanced flow condition can be maintained throughout the system. From each of the upper cylinder compartments 28, liquid flow to the accumulator is over the path port 36, annular passage 35, conduit 23, passage 52, and then into accumulator compartment 48 through passage 56. For reverse flow, fluid leaves compartment 48 past valve 70 and through passage 72 into passage 52 and then in the reverse direction over the path just given. In the conduit means attached to lower cylinder chamber 29, the path of fluid flow to the accumulator is through the interior of tube 34 to conduit 24 and then to passage 53 from which it goes into accumulator compartment 48 by way of passage 57. Fluid flow in the reverse direction through this same conduit means is past a valve 70 and through a pasage 73 to passage 53 and then in the reverse direction over the path just described.

From this it will be seen that each conduit means terminates at the accumulator in two branches, one branch being represented by passage 72 and the other branch by a portion of passage 52 and passage 56. In the case of the other conduit means one branch is passage 73 and the other branch is a portion of passage 53 and passage 57. In each of these branches is a valve 60 or 70 respectively.

It will be understood from inspection of Fig. 2 that the area on the under side of each piston 26 exposed to liquid pressure is greater than the area on the upper side by an amount equal to the gross cross sectional area of piston rod 27. Therefore, the net upward force applied to the piston by the liquid in chamber 29 is greater than the net downward force of the liquid in chamber 28 by an amount equal to the area of the piston rod multiplied by the unit pressure of liquid in the cylinder. This resultant force is exerted upwardly on piston rod 35 and supports in part the unsprung mass of the vehicle.

Assume that when valve 75 is in the open position a load is applied to one of the shock-absorbers in a direction to cause piston 26 to descend in cylinder 25. This occurs when a wheel of the vehicle hits a bump and rises relative to the frame. This movement of the piston causes displacement of liquid from chamber 29 and the addition of a lesser volume of liquid to chamber 28. Liquid flows upwardly through passage 32 into the upper cylinder chamber at a rate which is determined by the difference in unit pressures between the liquid in the upper and lower chambers and the resistance to flow offered by passage 32. The difference in unit pressure is a function of piston speed.

When the rate of piston movement is relatively slow, all of the liquid required to keep the upper chamber filled can pass through passage 32 into the upper chamber. The excess liquid displaced from chamber 29 flows up the inner tube 34 to the accumulator through conduit 24. There may be no liquid flow at all in conduit 23. This is the condition at low vehicle speeds when a comparatively low degree of resistance to piston movement is offered by the system. When piston 26 descends at a high velocity, as under shock loading, the volume of chamber 28 expands faster than fluid passes through passage 32. In this case also a substantial quantity of excess liquid flows up tube 34 and through conduit 24 into accumulator chamber 48; but there is now flow of liquid from accumulator 21 through conduit 23 into the upper chamber sufficient to keep the upper chamber filled.

Flow through conduit 24 to the accumulator does not take place until liquid pressure in chamber 29 exceeds the predetermined pressure required to open valve 60 and admit fluid to the accumulator. At any rate of descent of piston 26, the volume of lower chamber 29 contracts faster than the volume of upper chamber 28 expands, because of the introduction into the upper chamber of a portion of piston rod 27. The difference in the volumes of the two chambers represents a minimum volume of liquid which is transferred to the accumulator. Normally the transfer is through tube 34 and conduit 24, but there may be some transfer through the other conduit if the various pressures and flow resistances so permit. When piston 26 descends very rapidly, it may be that the rate of flow through passage 32 is inadequate to fill the rapidly expanding volume of chamber 28. In this case, some fluid is transferred from the accumulator through conduit 23 and port 36 into space 28. The lowered pressure in the upper cylinder chamber creates a pressure differential at valve 70 adequate to open the associated replenishing valve and allow liquid to flow out of chamber 48 through passage 72 into the conduit 23. This prompt opening of valve 70 and fluid flow are facilitated by maintaining super-atmospheric pressure in compartment 49 so that pressure is always maintained on the liquid in lower compartment 48.

On the rebound or upstroke of piston 26, flow conditions are generally similar to those just described except liquid flows in the reverse direction through conduits connecting the cylinder to the accumulator. However, there is one significant difference in that the volume of liquid displaced from the upper chamber of cylinder 25 is not sufficient to fill the expanding volume of the lower chamber, even though the piston moves slowly enough that all liquid leaving the upper chamber flows through passage 32. Consequently it is necessary to provide replenishing liquid from the accumulator. This enters the lower chamber through conduit 24 and inner tube 34.

When moving rapidly, the piston creates a zone of relatively low pressure at its retreating face. This condition is more pronounced on the upward than the downward movement of the piston and creates a differential pressure across the associated replenishing valve 70, allowing the valve to open and admit liquid from accumulator compartment 48. When piston 26 is moving up, liquid flows past valve 70 into passage 73, passage 53, and conduit 24. The existence of the super-atmospheric pressure in the compartment of the accumulator insures a positive pressure at all times in the system sufficient to cause the liquid to move rapidly into the lower cylinder chamber so that there is no vacuum between the retreating piston and the liquid in the lower chamber. Of course excess liquid from the upper chamber not transferred through passage 32 flows to the accumulator through conduit 23.

These ride conditions so far described have assumed that valve 75 is open for the so-called "soft" ride and is therefore in the normal position shown in Fig. 4. For higher vehicle speeds at which a greater degree of control is to be exercised by the shock-absorbers, valve 75 is moved to the closed position in which fluid flow to all the relief valves 60 is shut off by valve 75. Under these conditions, transfer of liquid between the two chambers of the cylinder through passage 32 accounts for nearly all the volume of liquid displaced from either chamber. Because of the high resistance to fluid flow offered by this passage, the movement of piston 26 in either direction is restricted to a much greater degree than when valve 75 is open. Liquid flow through the conduits connecting the cylinder to the accumulator is now greatly reduced. Flow out of the accumulator into either cylinder chamber is still freely possible since replenishing valves 70 open into the branches 72 and 73 of the conduit means which are not closed by valve 75. Limited flow of liquid out of the cylinder and into the accumlator through each conduit means is made possible by a bleeder port 82 connecting each passage 72 and 73 with the lower compartment 48. For the sake of convenience a port 82 is located in each valve 70 but the ports may be located in any other convenient place.

As illustrated in Figs. 6 to 9 inclusive a variational form of my invention has been modified from the above described form in a manner to effect control of the piston movement only on the down or compression stroke of the piston. A relief valve has been placed within each of the cylinders 25 in accordance with conventional practice and the accumulator has been modified not only by omitting the relief valves from the accumulator but also by rearranging the connections of the conduit means connecting the cylinders to the accumulator in a manner to interconnect the top and bottom chambers of each cylinder through the accumulator. This connection of the top and bottom cylinder chambers has in it the flow restricting means of the accumulator so that the transfer of fluid between the two chambers can be regulated at will by the driver.

The shock absorber unit 20 is constructed as previously described, except for the changes shown in Fig. 7. A modified form of piston 26a reciprocates within cylinder 25 to divide the cylinder space into two chambers 28 and 29, as before. Tube 34 within the hollow piston rod 27 extends entirely through the piston so that its open end is in free communication with lower piston chamber 29. Surrounding and slidable upon tube 34 is valve 90 which is adapted to engage on annular seat 91 on the piston, seat 91 surrounding and being of larger diameter than the end of annular passageway 35 within the piston rod. Compression spring 92 bears against the under side of valve 90 and biases it upwardly toward a closed position shown in the drawing, the lower end of the spring resting against plate 93. Relief valve 90 acts as a check valve to prevent liquid in lower cylinder chamber 29 from flowing upwardly in annular passage 35; but when the pressure above the valve is greater than that below, the valve opens against the force of spring 92 to admit liquid into chamber 29 from the upper chamber through port 36 and the lower end of liquid passage 35.

Plate 93 is perforated or otherwise shaped to permit the free access of liquid from chamber 29 below the piston to the vicinity of valve 90. These perforations in the plate also permit free access of a liquid to passage means 95 which interconnects the upper and lower chambers of the cylinder for the transfer of liquid through the piston and between the chambers at a restricted rate in the same manner as passage means 32, previously described.

Conduits 23 and 24 are each part of separate conduit means which directly connect upper chamber 28 and lower chamber 29 respectively with accumulator 21a which is shown in detail in Figs. 8 and 9. This variational form of accumulator is constructed in general in the same manner as previously described, with the exceptions now to be noted. Body 51a has two parallel, horizontal bores 97 entering from one side, each of which is axially aligned with a similar bore 98 which enters from the other side of body 51a. The outer end of each bore 97 and 98 is threaded to receive a nipple 54 and 55 respectively which provides means for attaching conduits 23 and 24 respectively to bores 97 and 98.

Passages 97 and 98 extend inwardly to centrally located valve 75a which is a cylindrical member journaled in body 51a. Valve 75a has two transversely extending passages 99 each of which serves to place a passage 97 in communication with the opposite passage 98 when valve 75a is in the normal or open position as shown in Figs. 8 and 9. Under these circumstances there is free communication and free liquid flow between conduit 23 and passage 97 on one side of the valve and conduit 24 and passage 98 on the other side of the valve. This is true for both pairs of conduits 23 and 24 connected to accumulator 21a from the two cylinders 25.

When rotated 90° from the position shown, valve 75a is adapted to restrict the flow of liquid between the associated passages 97 and 98. The restriction may be absolute, that is, all liquid flow past the valve between these two passages may be prevented; or there may be permitted a limited amount of flow between the passages. As means for permitting limited flow, valve 75a is provided with two transverse bores 100 the axes of which are at 90° with respect to bores 99 so that when the valve is rotated 90° from the position shown, a highly restricted fluid flow is permitted between associated passages 97 and 98 through one of the small passages 100. Rotation of valve 75a may be effected through lever arm 80 to which may be connected any suitable type of valve operating mechanism, not shown in the drawings.

Although the form of accumulator shown in Figs. 8 and 9 does not include any relief valves, it does include replenishing valves 70. These valves are mounted, as previously described, on valve plate 62a to close an opening therein, each valve being biased upwardly toward the closed position by the compression spring 71. Each replenishing valve 70 is located at the upper end of a branch passage 72a or 73a, each connected at its lower end with a passage 97 or 98 respectively. Each of the passages 72a and 73a constitutes a branch portion of the conduit means communicating with one of the cylinder chambers by which the conduit means is placed in direct communication with lower compartment 48 of the accumulator to receive liquid therefrom when check valve 70 is open as a result of a higher liquid pressure existing within the accumulator.

At least one bleeder port 82 for each cylinder 25 is required to admit excess liquid from the cylinder to the accumulator when the piston in the cylinder descends. Ports 82 are located one in each of valves 70 as a matter of convenience, but may equally well be placed at a different location, to provide very limited communication between lower compartment 48 and each of passages 72a and 73a.

When in operation, assuming that valve 75a is in the normal position for the "soft" ride, the operation of this embodiment of my invention is generally similar to that previously described. However, there is a difference at relatively lower rates of piston descent in cylinder 25 because of the absence of any relief valve which remain closed until fluid pressure has built up to a predetermined value required to open the valve. As piston 26a descends in cylinder 25, liquid is transferred from lower chamber 29 to upper chamber 28 through one or more passages 95. At relatively low rates of piston travel, liquid can flow through this passage means with sufficient rapidity to keep the upper chamber filled. However, since the decrease in volume of the lower chamber is greater than the increase in volume of the upper chamber, there is a resultant transfer of liquid to the accumulator regardless of the rate of piston travel.

If the piston descends very rapidly, only a portion of the liquid required to fill the expanding volume of chamber 28 can flow through passage means 95; and the excess liquid displaced from contracted chamber 29 flows through tube 34 and conduit 24 to the accumulator. Since passages 98 and 97 are in direct communication with each other through valve passage 99, this excess liquid is transferred immediately and directly to conduit means 23 so that the deficiency of liquid in upper chamber 28 is made up by liquid which enters the chamber through passage 35—36. As long as the valve 75a remains open, the upper and lower chambers of the cylinders are in free communication with each other, the only restriction on fluid flow between them being that imposed by friction losses in conduits 23 and 24 and the connected passages.

When the piston moves upwardly on the rebound, lower chamber 29 expands in volume more rapidly than upper chamber 28 contracts. Consequently, there is a net transfer of fluid to the cylinder from the accumulator, fluid for replenishing purposes passing out of the compartment 48 past one of the replenishing valves 70.

At relatively low rates of piston travel upward, much of the liquid displaced from the upper chamber is transferred directly to the lower chamber through passage means 95, although there is some fluid flow from the cylinder through conduit 23 to the accumulator, through the accumulator to conduit 24 and then into the lower chamber of the cylinder through inner tube 34. At higher rates of upward travel of the piston, the unit pressure on the fluid in the upper chamber increases until finally the pressure there reaches a predetermined value at which relief valve 90 opens, permitting the fluid from the upper chamber to travel directly through ports 36 into the lower portion of annular passage 35 and past valve 90 into lower chamber 28.

If it is desired to increase the stability of the vehicle body, valve 75a is rotated 90° to the closed position. This stability or control is obtained by restricting the rate of descent of piston 26a. When the valve is closed, the flow of fluid is as just described except that flow from passage 98 to passage 99 is very highly restricted because of the small size of valve passage 100. If valve passage 100 is omitted, a comparable degree of restriction is still effected by port 82 in replenishing valve 70 communicating with passage 98 since a small amount of liquid can pass through this port into accumulator compartment 48 and then pass the other replenishing valve into passage 97. Some liquid may follow this path although passage 100 is used. The higher degree of flow restriction imposed by the valve means in the accumulator requires a relatively larger volume of liquid to be transferred between the two cylinder chambers by way of passage means 95 thus increasing the resistance to downward movement of piston 26a and producing "hard" riding characteristics of the vehicle.

On the rebound stroke, the restriction on liquid flow imposed by valve 75a has relatively little effect upon the resistance to upward movement of the piston, especially at higher piston speeds. At low piston speeds, fluid pressure in the upper chamber may not be sufficient to open valve 90; but at higher piston speeds liquid pressure is adequate to open this valve, permitting liquid to flow past it into the lower chamber. Valve 75a has no restrictive effect upon this flow which takes place entirely within each of cylinders 25.

Fig. 10 shows a simplified accumulator 21b which, except as noted, is constructed like accumulator 21a. In the simplified form, replenishing valves 70 are omitted and the branch passages 72b and 73b from passages 97 and 98 respectively to the interior of the accumulator are greatly reduced in size in order to obtain a desired degree of restriction to liquid flow. With the omission of the replenishing valves, hold-down 66 is likewise omitted and the plate 62b is secured in place by bolt 67b. Plate 62b now serves primarily to hold in place suitable packing to prevent leakage of liquid from the accumulator.

The operation of this form of accumulator will be self-evident from the preceding description. In this form, the size of passages 72b and 73b is closely controlled since these passages now are a part of the means for restricting flow of the liquid into the accumulator but their effect is constant at all times. Flow between associated passages 97 and 98 is controlled as before by valve 75a.

From the foregoing description it will be evident that various changes in the location and arrangement of parts of the complete system may be made without departing from the spirit and scope of my invention. Accordingly, it is to be understood that the foregoing description is considered to be illustrative of, rather than limitative upon, the appended claims.

I claim:

1. In a fluid-type shock-absorber and ride stabilizing system for a vehicle, the combination comprising: a cylinder having a piston reciprocable within the cylinder and dividing the interior of the cylinder into two separate chambers each filled with liquid; unobstructed passage means extending between the two chambers for transfer of liquid from either one of the chambers to the other chamber at a restricted rate of flow; an accumulator; separate conduit means connecting each cylinder chamber directly with the accumulator to receive excess liquid from either chamber and to replenish each chamber independently of the other chamber; and flow regulating means associated with each conduit adapted to regulate flow of liquid equally and simultaneously in all conduit means to the accumulator.

2. In a fluid-type shock-absorber and ride stabilizing system for a vehicle, the combination comprising: a cylinder having a piston reciprocable within the cylinder and dividing the interior of the cylinder into two separate chambers each filled with liquid; passage means extending between the two chambers for transfer of liquid between the chambers at a restricted rate of flow; an accumulator; separate conduit means connecting each cylinder chamber directly with the accumulator to receive excess liquid from either chamber and to replenish each chamber independently of the other chamber; a relief valve associated with each conduit means restricting flow of liquid from the conduit means into the accumulator; adjustable flow regulating means associated with each conduit means and interposed between the relief valves and the cylinders to regulate liquid flow in all said conduit means; and means for applying superatmospheric pressure to liquid in the system.

3. In a fluid-type shock-absorber and ride stabilizing system for a vehicle, the combination comprising: a plurality of cylinders each having a piston reciprocable within the cylinder and dividing the interior of the cylinder into two separate chambers each filled with liquid; unobstructed passage means extending between the two chambers of each cylinder for transfer of liquid from either one of said two chambers to the other chamber at a restricted rate of flow; an accumulator; separate conduit means connecting each cylinder chamber directly with the accumulator to receive excess liquid from either chamber and to replenish each chamber independently of the other chamber; and valve means located in the accumulator adapted to restrict flow of liquid equally and simultaneously in all of said separate conduit means.

4. In a fluid-type shock-absorber and ride stabilizing system for a vehicle, the combination comprising: a plurality of cylinders each having a piston reciprocable within the cylinder and dividing the interior of the cylinder into two separate chambers each filled with liquid; unobstructed passage means extending between the two chambers of each cylinder for transfer of liquid from either one of said two chambers to the other chamber at a restricted rate of flow; an accumulator; separate conduit means connecting each cylinder chamber directly with the accumulator to receive excess liquid from either chamber and to replenish each chamber independently of the other chamber; and a flow regulating member movably mounted in the accumulator and movable between a first position permitting substantially free flow from said conduit means into the accumulator and a second position restricting flow of liquid from all of said separate conduit means into the accumulator.

5. In a fluid-type shock-absorber and ride stabilizing system for a vehicle, the combination comprising: a plurality of cylinders each having a piston reciprocable within the cylinder and dividing the interior of the cylinder into two separate chambers each filled with liquid; passage means extending between the two chambers of each cylinder for transfer of liquid between said two chambers at a restricted rate of flow; an accumulator comprising a hollow pressure vessel divided into two separate interior compartments of which one compartment is filled with gaseous fluid under pressure; separate conduit means connecting each cylinder chamber directly with the other compartment of the accumulator to receive excess liquid from either chamber and to replenish each chamber independently of the other chamber; a relief valve associated with each conduit means restricting flow of liquid from the conduit means into the accumulator; and flow regulating means associated with each conduit adapted to regulate liquid flow equally and simultaneously in all conduit means to the relief valves.

6. In a fluid-type shock-absorber and ride stabilizing system for a vehicle, the combination comprising: a plurality of cylinders each having a piston reciprocable within the cylinder and dividing the interior of the cylinder into two separate chambers each filled with liquid; passage means extending between the two chambers of each cylinder for transfer of liquid between said two chambers at a restricted rate of flow; an accumulator; separate conduit means connecting each cylinder chamber directly with the accumulator to receive excess liquid from either chamber and to replenish each chamber independently of the other chamber, each conduit means terminating within the accumulator in two branches; a relief valve associated with one branch of each conduit means restricting flow of liquid from the conduit means into the accumulator; a check valve associated with the other branch of each conduit means preventing flow of liquid into the accumulator through said other branch and opened by differential liquid pressure to permit flow from the accumulator into the conduit means; and means for applying superatmospheric pressure to liquid in the system.

7. In a fluid-type shock absorber and ride stabilizing system for a vehicle, the combination comprising: a plurality of cylinders each having a piston reciprocable within the cylinder and dividing the interior of the cylinder into two separate chambers each filled with liquid; passage means extending between the two chambers of each cylinder for transfer of liquid between said two chambers at a restricted rate of flow; an accumulator; separate conduit means connecting each cylinder chamber directly with the accumulator to receive excess liquid from either chamber and to replenish each chamber independently of the other chamber, each said conduit means terminating within the accumulator in two branches; and a check valve associated with one branch of each conduit means preventing flow of liquid into the accumulator through said one branch and opened by differential liquid pressure to permit free flow from the accumulator into the conduit means; and means for applying superatmospheric pressure to liquid in the system.

8. In a fluid-type shock-absorber and ride stabilizing system for a vehicle, the combination comprising: a plurality of cylinders each having a piston reciprocable within the cylinder and dividing the interior of the cylinder into two separate chambers each filled with liquid; passage means extending between the two chambers for transfer of liquid between the chambers at a restricted rate of flow; an accumulator comprising a hollow pressure vessel divided into two separate interior compartments of which one compartment is filled with gaseous fluid under pressure; separate conduit means connecting each cylinder chamber directly with the accumulator to receive excess liquid from either chamber and to replenish each chamber independently of the other chamber, each said conduit means terminating in two branches both communicating with the other compartment of the accumulator; a relief valve associated with one branch of each conduit means restricting flow from the conduit means into the accumulator; a replenishing check valve associated with the other branch of each conduit permitting free flow of liquid into the conduit means from the accumulator when the check valve is open; and a single flow regulating member associated with the first mentioned branch of all conduit means to regulate liquid flow in said branches equally and simultaneously.

9. A system as in claim 8 in which the flow regulating member is movable between a first position offering substantially no flow restriction and a second position substantially preventing flow in all said first mentioned branches.

10. In a fluid-type shock-absorber and ride stabilizing system for a vehicle, the combination comprising: a plurality of cylinders each having a piston reciprocable within the cylinder and dividing the interior of the cylinder into two separate chambers each filled with liquid; passage means extending between the two chambers of each cylinder for transfer of liquid between said two chambers at a restricted rate of flow; an accumulator having a body defining aligned passages; separate conduit means connecting each cylinder chamber directly with the accumulator to receive excess liquid from either chamber and to replenish each chamber independently of the other chamber; valve means in the accumulator movable between a first position permitting substantially free flow through said aligned passages between the conduit means connected to each of said two separate chambers of each cylinder and a second position restricting flow through said aligned passages; and passage means in the accumulator permitting restricted flow into said accumulator from each of said separate conduit means and by-passing said valve means.

References Cited in the file of this patent

UNITED STATES PATENTS

| | | |
|---|---|---|
| Re. 18,747 | Gray | Feb. 28, 1933 |
| 1,768,696 | Laddon | July 1, 1930 |
| 1,938,568 | Christman | Dec. 12, 1933 |
| 1,957,658 | Logan | May 8, 1934 |
| 2,040,262 | Kruckenberg et al. | May 12, 1936 |
| 2,065,832 | Spyker | Dec. 29, 1936 |